(12) United States Patent
Amarilio et al.

(10) Patent No.: US 10,560,780 B2
(45) Date of Patent: Feb. 11, 2020

(54) PHASE ALIGNMENT IN AN AUDIO BUS

(71) Applicant: QUALCOMM Incorporated, San Diego, CA (US)

(72) Inventors: Lior Amarilio, Yokneam (IL); Ghanashyam Prabhu, Bangalore (IN); Sharon Graif, Zichron Yaakov (IL); Mouna Elkhatib, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/260,325

(22) Filed: Jan. 29, 2019

(65) Prior Publication Data
US 2019/0289393 A1 Sep. 19, 2019

(30) Foreign Application Priority Data
Mar. 13, 2018 (IN) .............................. 201841009165

(51) Int. Cl.
| | | |
|---|---|---|
| H04B 3/00 | (2006.01) | |
| H04R 3/12 | (2006.01) | |
| G06F 3/16 | (2006.01) | |
| H04R 5/04 | (2006.01) | |
| H04R 3/00 | (2006.01) | |
| G06F 13/42 | (2006.01) | |

(52) U.S. Cl.
CPC .............. *H04R 3/12* (2013.01); *G06F 3/162* (2013.01); *G06F 3/165* (2013.01); *H04R 3/005* (2013.01); *H04R 5/04* (2013.01); *G06F 13/4291* (2013.01)

(58) Field of Classification Search
CPC ........................... G08B 7/066; H04R 2499/11
USPC .................................. 381/56, 58, 77
See application file for complete search history.

(56) References Cited

U.S. PATENT DOCUMENTS

| 9,841,940 B2 | 12/2017 | Khazin et al. |
| 2016/0072492 A1 | 3/2016 | Amarilio et al. |
| 2017/0033754 A1 | 2/2017 | Perrott |

OTHER PUBLICATIONS

International Search Report and Written Opinion for PCT/US2019/015805, dated Mar. 26, 2019, 12 pages.

*Primary Examiner* — George C Monikang
(74) *Attorney, Agent, or Firm* — Withrow & Terranova, PLLC

(57) ABSTRACT

Exemplary aspects of the present disclosure assist in phase alignment for systems having multiple audio sources. For example, in a system having plural microphones, phase alignment may also be assisted by sampling the microphones at the appropriate time relative to when the samples are placed on the audio bus. Further, phase shifts between audio samples are reduced or eliminated by keeping a sample delay constant for samples from the same microphone. Such manipulation of the audio samples reduces phase shifts which reduces the likelihood of an audio artifact capable of being detected by the human ear and thus improves consumer experience.

17 Claims, 15 Drawing Sheets

PHASE ALIGNMENT IN AN AUDIO BUS

PRIORITY CLAIM

The present application claims priority to Indian Provisional Patent Application Serial No. 201841009165 filed on Mar. 13, 2018 and entitled "PHASE ALIGNMENT IN AN AUDIO BUS," the contents of which is incorporated herein by reference in its entirety.

BACKGROUND

I. Field of the Disclosure

The technology of the disclosure relates generally to audio buses and, more particularly, to phase alignment in a SOUNDWIRE audio bus.

II. Background

Mobile phones have evolved from relatively simple devices that mimicked operation of a phone on the Public Switched Telephone Network (PSTN) to complex mobile computing devices that include substantial computing power capable of performing many computing functions as well as serving as multimedia platforms for audio and/or video capture and/or playback.

To assist in the handling of audio activity, such mobile computing devices may include multiple microphones and multiple speakers. Various techniques exist to facilitate communication between these audio components and an audio processor. Most such techniques contemplate an analog interface requiring a dedicated two-port wiring. The MIPI® Alliance initially published the Serial Low-power Inter-chip Media Bus (SLIMbus$^{SM}$) standard to harmonize communication between these audio components and the audio processor. However, SLIMbus has not seen widespread industry adoption, due in part to its complexity. In response to the low acceptance of SLIMbus, the Low Speed Multipoint Working Group (LML-WG) of MIPI has promulgated a new standard called SOUNDWIRE™, which is conceptually simpler than SLIMbus. SOUNDWIRE allows all devices to share a two-wire communication bus having a clock and data line to transport multiple audio channels. The devices share the data line through a time division multiplexing (TDM) frame structure to transport media streams. SOUNDWIRE has seen some evolution into alternate structures such as SOUNDWIRE-XL and SOUNDWIRE NEXT. The channels may have different or identical audio rates and they may be transported to and/or from one or multiple components.

Mobile computing devices typically run on a rechargeable battery. Consumer demand requires maximizing time between recharging the battery, and thus, there is substantial pressure to reduce power consumption within mobile computing devices. SOUNDWIRE, as originally proposed by MIPI, may not provide optimal power savings for mobile computing devices. One technique that has been adopted to help reduce power consumption is changing the clock frequency to a lower clock frequency when usage does not demand a higher clock frequency.

The human ear is sensitive to phase changes in audio streams. Clock frequency changes can cause phase changes and thus may result in a degraded user experience.

SUMMARY OF THE DISCLOSURE

Aspects disclosed in the detailed description include systems and methods for phase alignment in an audio bus. In particular, exemplary aspects of the present disclosure assist in phase alignment for systems having multiple audio sources. For example, in a system having plural microphones, phase alignment may also be assisted by sampling the microphones at the appropriate time relative to when the samples are placed on the audio bus. Further, phase shifts between audio samples are reduced or eliminated by keeping a sample delay constant for samples from the same microphone. Such manipulation of the audio samples reduces phase shifts which reduces the likelihood of an audio artifact capable of being detected by the human ear and thus improves consumer experience.

In this regard, in one aspect, a method of aligning plural audio signals from plural audio sources is disclosed. For each audio source of the plural audio sources, the method includes collecting audio data at a sample logic circuit from a respective audio source. The method also includes strobing the sample logic circuit to release the audio data to an audio port in a SOUNDWIRE circuit. The method also includes synchronizing strobes with a synchronization logic circuit.

In another aspect, an apparatus including a SOUNDWIRE slave device is disclosed. The SOUNDWIRE slave device includes a plurality of audio sources. The SOUNDWIRE slave device also includes a sample logic circuit coupled to the plurality of audio sources and configured to collect audio data therefrom responsive to a strobe from the sample logic circuit. The SOUNDWIRE slave device also includes a synchronization logic circuit to synchronize strobes.

In another aspect, an apparatus is disclosed. The apparatus includes a speaker. The apparatus also includes a plurality of sample logic circuits coupled to the speaker. The apparatus also includes a SOUNDWIRE slave circuit including a plurality of data ports. Each of the plurality of data ports is coupled to respective ones of the plurality of sample logic circuits. The apparatus also includes a synchronization logic circuit coupled to the SOUNDWIRE slave circuit and configured to cause each of the plurality of data ports to release audio data to the respective ones of the plurality of sample logic circuits concurrently.

In another aspect, a method of controlling an audio bus is disclosed. The method includes determining that a frequency change is appropriate on an audio bus. The method also includes updating a register at a slave indicating a new frequency and a new sample interval. The method also includes issuing a bank switch command. The method also includes, after issuing the bank switch command, changing a clock frequency of the audio bus to the new frequency at a frame boundary on a last falling edge of a clock signal.

In another aspect, a SOUNDWIRE master circuit is disclosed. The SOUNDWIRE master circuit includes a SOUNDWIRE bus interface configured to be coupled to a SOUNDWIRE bus. The SOUNDWIRE master circuit also includes a control system operatively coupled to the SOUNDWIRE bus interface. The control system is configured to determine that a frequency change is appropriate. The control system is also configured to update a register at a slave indicating a new frequency and a new sample interval. The control system is also configured to issue a bank switch command. The control system is also configured, after issuing the bank switch command, to change a clock frequency to the new frequency at a frame boundary on a last falling edge of a clock signal.

DETAILED DESCRIPTION

Figure 1:
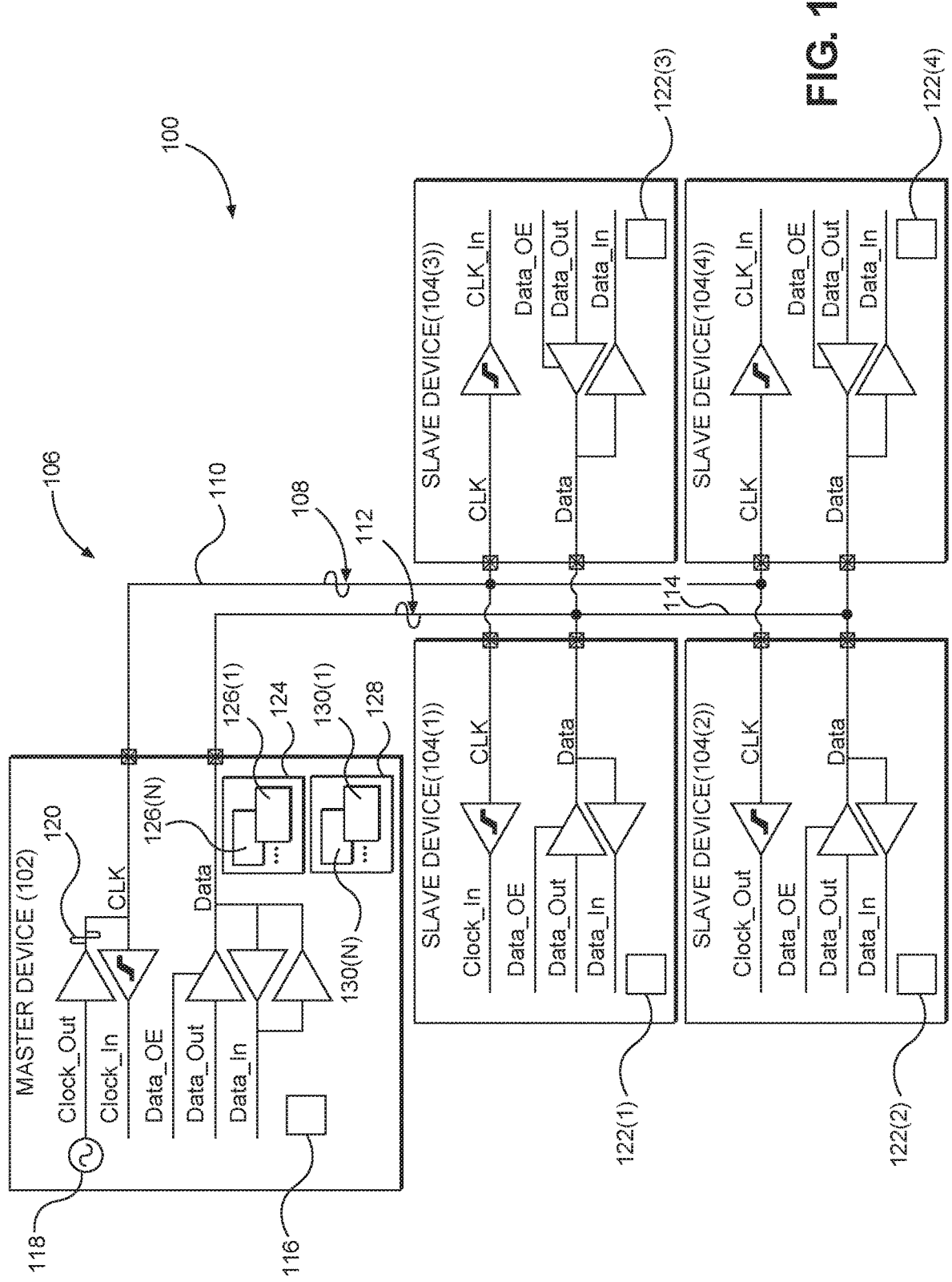
FIG. 1 is a block diagram of an exemplary computing device having an audio system using a SOUNDWIRE™-compliant communication system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for phase alignment in an audio bus. In particular, exemplary aspects of the present disclosure assist in phase alignment for systems having multiple audio sources. For example, in a system having plural microphones, phase alignment may also be assisted by sampling the microphones at the appropriate time relative to when the samples are placed on the audio bus. Further, phase shifts between audio samples are reduced or eliminated by keeping a sample delay constant for samples from the same microphone. Such manipulation of the audio samples reduces phase shifts which reduces the likelihood of an audio artifact capable of being detected by the human ear and thus improves consumer experience.

Before addressing exemplary aspects of the present disclosure, a brief overview of an audio system is provided with reference to FIG. 1. Exemplary aspects of the present disclosure begin below with reference to FIG. 3.

In this regard, FIG. 1 is a block diagram of an exemplary computing device with an audio system 100 having one (1) master device 102 and four (4) slave devices 104(1)-104(4) communicatively coupled to a communication bus 106. In an exemplary aspect, the audio system 100 is a SOUNDWIRE system and the communication bus 106 may be a SOUNDWIRE communication bus. In an exemplary aspect, the slave devices 104(1)-104(4) may be microphones, speakers, or other audio devices. The master device 102 communicates with the slave devices 104(1)-104(4) using two (2) signals: a clock signal 108 (sometimes referred to herein as CLK) communicated over a common clock wire 110, and a data signal 112 (sometimes referred to herein as DATA) communicated over a common data wire 114 of the SOUNDWIRE communication bus 106. While only four slave devices 104(1)-104(4) are illustrated in FIG. 1, it should be appreciated that the SOUNDWIRE standard supports up to eleven (11) slave devices 104 per master device 102. The master device 102 may have a control system 116 associated therewith, which may be a hardware-implemented processor with associated software stored in memory associated with the processor. In one exemplary aspect, the control system 116 is part of a system-on-a-chip (SoC) or application processor of the master device 102. In an alternate exemplary aspect, the control system 116 may be associated with a central processor for a computing device that includes the audio system 100. The master device 102 may also have a clock source 118 that generates a master clock (sometimes referred to as MCLK) signal 120. In further exemplary aspects, the slave devices 104(1)-104(4) each have a respective slave control system 122(1)-122(4). Notably, while this aspect illustrates various elements within the master device 102 and the slave devices 104(1)-104(4), other aspects may include alternative elements or configurations and achieve similar functionality. In this regard, the master device 102 may further include a register bank 124 (also referred to as Bank 0) with registers 126(1)-126(N) (illustrated in FIG. 4 in greater detail) and a register bank 128 (also referred to as Bank 1) with registers 130(1)-130(N) (also illustrated in FIG. 4 in greater detail).

As alluded to above, the clock signal 108 is generally over-engineered so that any audio stream may be properly supported on the audio system 100. That is, the clock signal 108 generally has a frequency that is sufficiently high that any audio stream may be supported. High-frequency signals generally consume more power than low-frequency signals and generate greater electromagnetic interference (EMI). In many instances, the audio streams on the communication bus 106 may not require such high-frequency clock signals.

Figure 2:
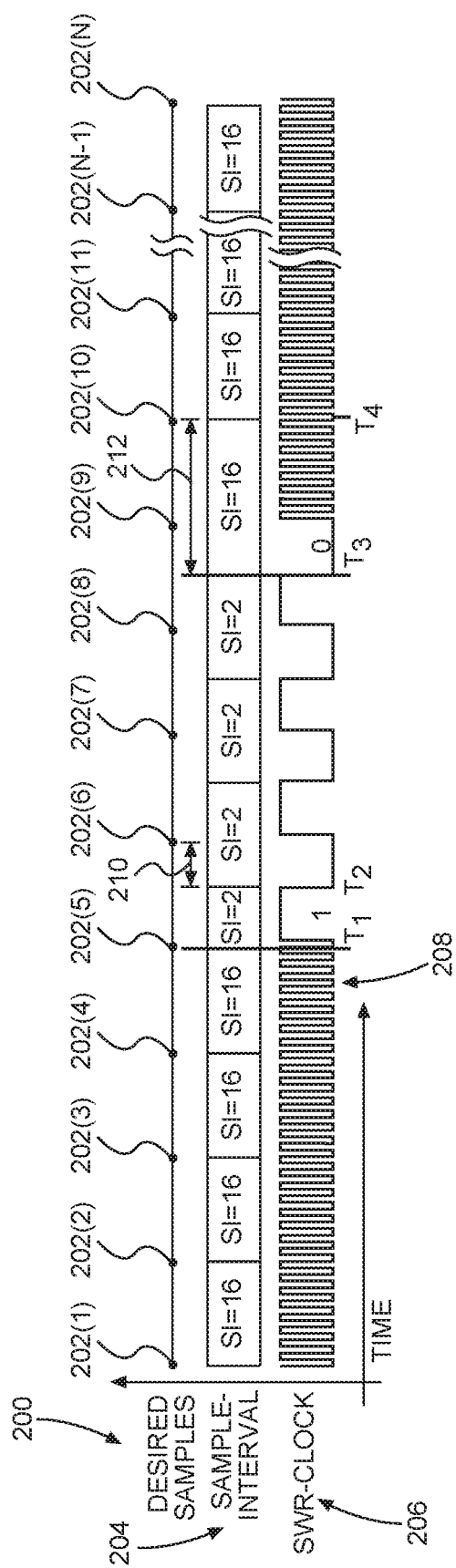
FIG. 2 is a diagram of a frequency-changing bus clock signal compared to desired sampling locations relative to a sample interval without benefit of the present disclosure.

Accordingly, there may be instances where the frequency of the clock signal 108 is lowered (e.g., when only a microphone is being used in a listen mode). However, if the clock is changed at any random time, there may be a phase change between the samples at the different frequencies. This situation is illustrated in FIG. 2. In particular, an audio stream at a microphone may have a desired sample rate of 44.1 kilohertz (kHz), corresponding to a sample taken every 22.68 microseconds (μs), or 48 kHz, corresponding to a sample taken every 20.08 μs. Regular samples are indicated at 200 as sampling times 202(1)-202(N). A sample interval 204 changes based on the clock frequency shown by a clock signal 206. In particular, when the clock signal 206 is at an initial frequency of 9.6 megahertz (MHz) (generally at section 208), the sample interval 204 is sixteen (16), meaning that sixteen clock cycles occur between each sampling time 202. At time t1, the clock signal 206 changes frequency to 0.6 MHz. The sample interval 204 correspondingly changes to two (2).

However, the two clock transitions are finished at time t2, resulting in a sample taking place at time t2. The expected sampling time would have been at 202(6), resulting in a phase shift 210. Similarly, when the clock signal 206 returns to a faster frequency at time t3, the expected sampling time would have been at 202(9), but is delayed until time t4 after sixteen edges have been counted, resulting in another phase shift 212.

Figure 3A:
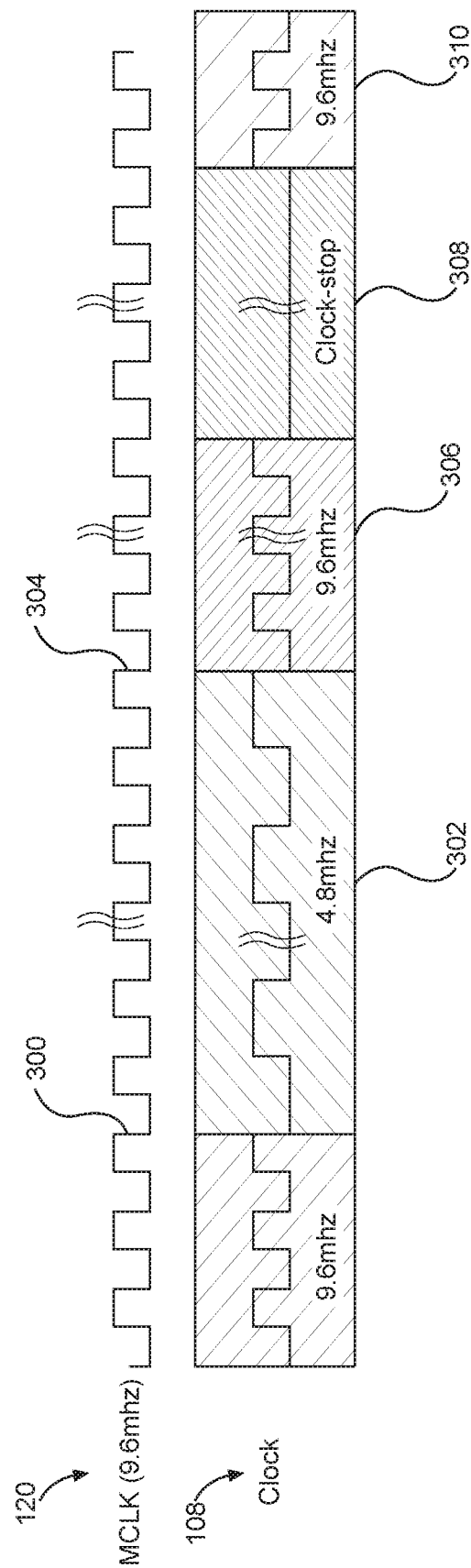
FIG. 3A is a diagram of a frequency-changing bus clock signal according to exemplary aspects of the present disclosure.
Figure 3B:
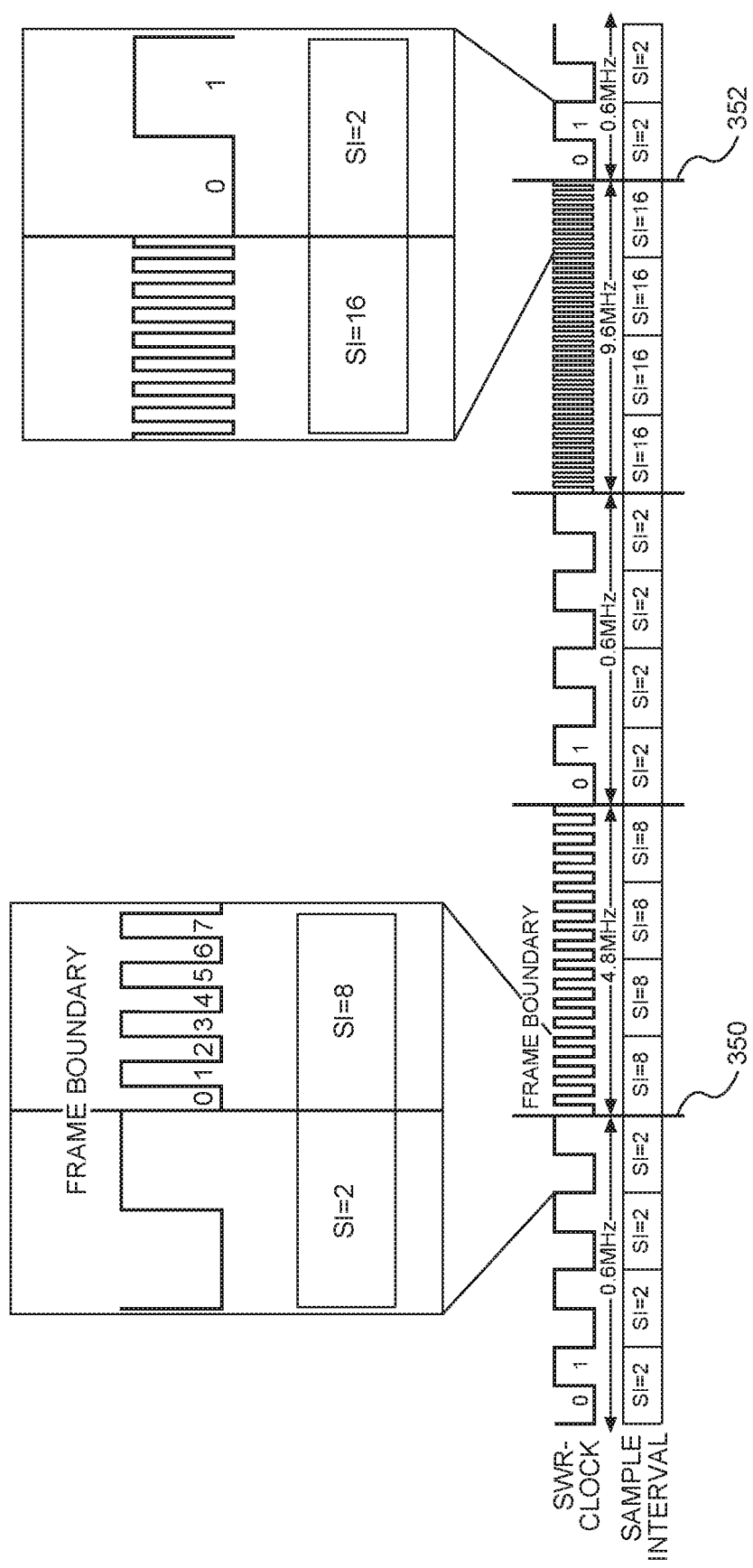
FIG. 3B is a diagram of a frequency-changing bus clock signal according to an exemplary aspect of the present disclosure moving between three frequencies with the frame boundary exploded to illustrate the falling edge of the clock relative to the frame boundary and how the sample interval changes at the frame boundary.

In this regard, exemplary aspects of the present disclosure allow the master device 102 of FIG. 1 to send a command to the slave devices 104(1)-104(4), wherein the command includes instructions on an upcoming frequency shift and a new sample interval. In this regard, FIG. 3A illustrates the MCLK signal 120 and the clock signal 108 of FIG. 1. The MCLK signal 120 may be a stable signal and may, in an exemplary aspect, be 9.6 MHz. When the control system 116 determines that a lower clock frequency may be used, the control system 116 causes the clock signal 108 to be modified to a lower frequency. Thus, after the command is generated to transition to a lower-frequency clock signal 108, when the MCLK signal 120 reaches a last falling edge 300 of a frame, a new frame 302 begins, and the clock signal 108 begins at a lower frequency (as illustrated, 4.8 MHz, down from the initial 9.6 MHz). This change in frequency may occur when the slave device 104 enters a listen lower mode. At some subsequent time, the control system 116 may determine that a higher-frequency clock signal 108 is needed, and a command is generated to transition to a higher frequency. Thus, when the MCLK signal 120 reaches a last falling edge 304 of the frame 302 (or other subsequent frame), the clock signal 108 begins at the higher frequency in frame 306. This change in frequency may occur when there is concurrent use of microphones and speakers, for example. At some point, it may be possible to stop sending the clock signal 108 for one or more frames 308 and resume the clock signal 108 at some subsequent time at an appropriate frequency in a subsequent frame 310, wherein such stoppage of the clock signal 108 is defined by the SOUND-WIRE standard. While only two frequencies (e.g., 9.6 MHz and 4.8 MHz) are shown, it should be appreciated that more than two frequencies may be used. Likewise, other frequencies, such as 3.2 MHz, 6.4 MHz, 2.4 MHz, and 7.2 MHz, may be used.

FIG. 313 illustrates a clock frequency changing between three frequencies with exploded portions at frame boundaries 350 and 352. In particular, the end of the frame is shown falling on a falling edge of the clock signal and the new frequency starting immediately at the frame boundary so that the new frequency is aligned with the original sample rate even at the new sample interval.

Exemplary aspects of the present disclosure prevent phase shifts from occurring during clock frequency transitions by requiring that any clock change take place at a frame boundary and, specifically, at a last falling edge of the clock signal 108 following a bank switch command. By following these requirements, audio sampling is maintained constant with a uniform phase offset.

Figure 4:
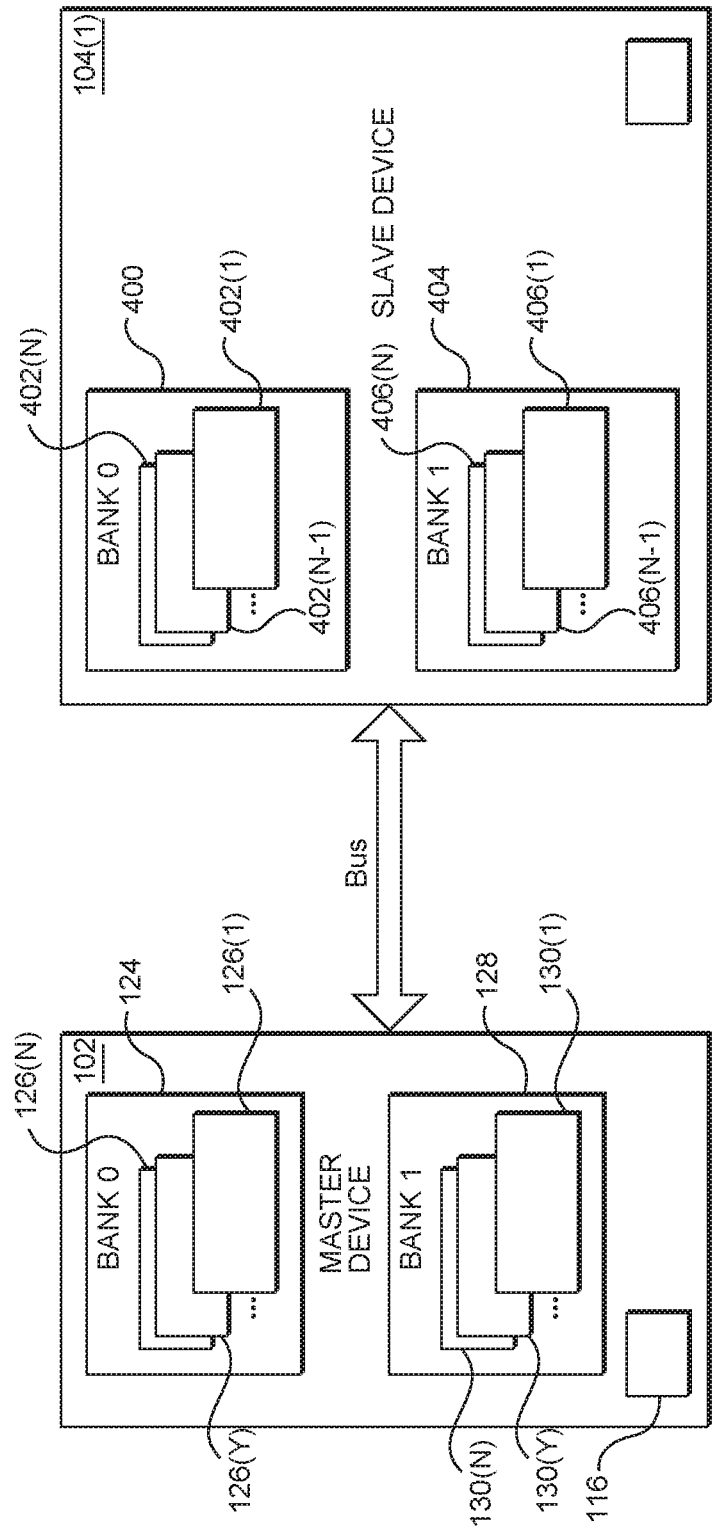
FIG. 4 is a simplified block diagram of a master and a slave connected by a communication bus using a bank switch command to facilitate clock frequency changes.

To assist in changing the frequency of the clock signal 108, exemplary aspects of the present disclosure take advantage of the bank switch command that is part of the SOUND-WIRE standard. In this regard, each of the slave devices 104(1)-104(4) has one or more additional registers added to register banks. One such slave device 104(1) coupled to the master device 102 is illustrated in FIG. 4. In particular, the slave device 104(1) has a register bank 400 (also referred to as Bank 0) with registers 402(1)-402(N) and a register bank 404 (also referred to as Bank 1) with registers 406(1)-406(N). One register in each bank (e.g., register 402(N−1) and register 406(N−1)) is configured to hold information about the sample rate. To this end, the master device 102 sends an instruction to write the sample rate into the passive or inactive register (either the register 402(N−1) or the register 406(N−1), depending on which bank is active) at the same time that the bank switch command is issued. As is understood, the bank switch command causes the active and passive registers to invert such that a currently active register becomes the passive register and the currently passive register becomes the active register. Then at the next frame end, the slave device 104(1) switches active banks (e.g. from the register bank 400 to the register bank 404 or vice versa). With the bank switch command, the slave device 104(1) uses the parameters of the newly activated register bank and operates accordingly (i.e., changes the sample interval to match the new frequency). It should be appreciated that the change can be performed while the audio streams are active and without disrupting the audio streams.

With continued reference to FIG. 4, the master device 102 may, as mentioned above, also include the register banks 124 and 128. One register in each of the register banks 124 and 128 (e.g., register 126(Y) and register 130(Y)) is configured to hold information about the clock bus frequency. The register 126(Y) and the register 130(Y) may sometimes be referred to as master clock generator bank registers.

As noted above, exemplary aspects of the present disclosure force the timing of the clock change to comply with certain conditions, namely that the change occur at a frame boundary and specifically at a last falling edge of the clock signal 108 following a bank switch command. By following these requirements the audio sampling is maintained constant with a uniform phase offset. The master device 102 informs the slave device 104 of the upcoming frequency change by writing to the registers in the slave register bank and then executing the bank switch command.

Figure 5:
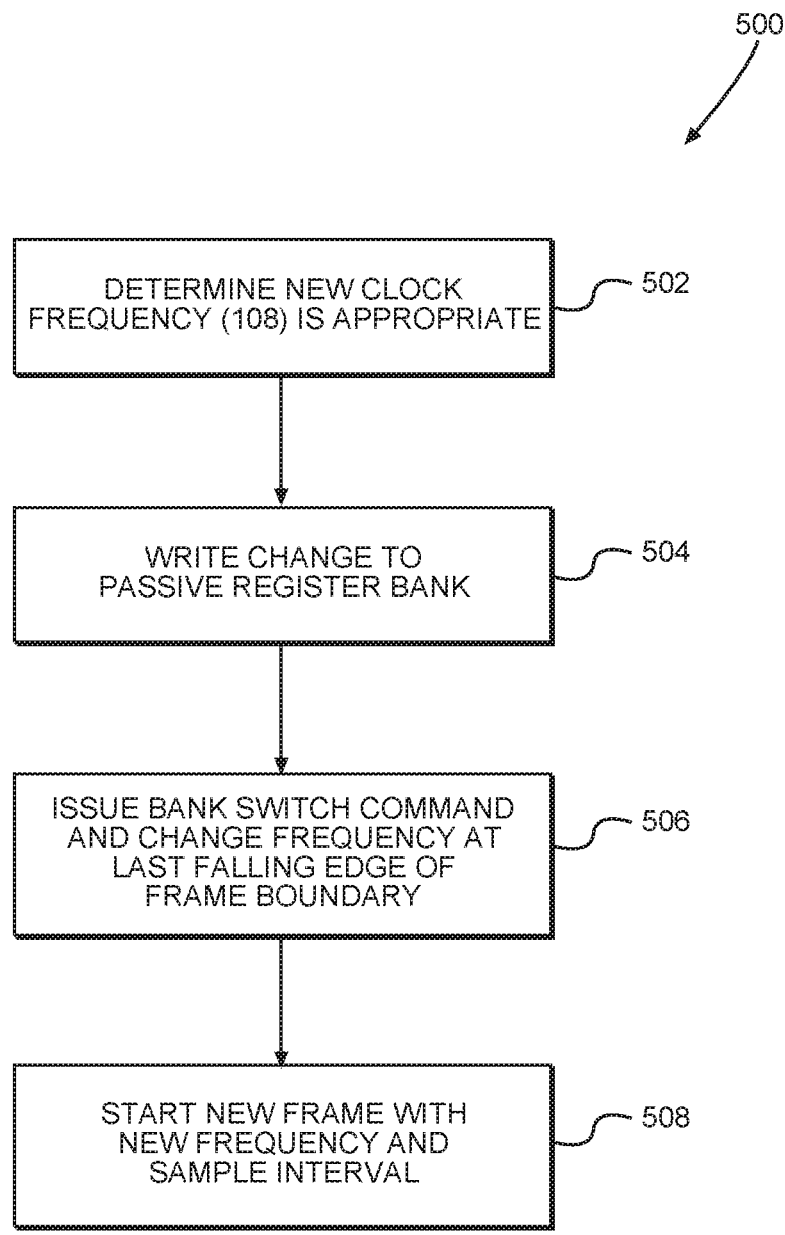
FIG. 5 is a flowchart of an exemplary method through which the clock frequency of the audio system of FIG. 1 may be changed.

FIG. 5 is a flowchart of a process 500 to reduce phase shifts in an audio stream during a bus clock frequency change according to an exemplary aspect of the present disclosure. In this regard, the process 500 begins by determining a new frequency of the clock signal 108 is appropriate (block 502). More information about an exemplary process for how this determination may be done can be found in U.S. Pat. No. 9,841,940, which is hereby incorporated by reference in its entirety. The data associated with the new frequency (i.e., sample interval, frequency, and the like) are written to the passive register bank (i.e., the register bank 400 or 404) in the slave device 104 (block 504). The master device 102 issues a bank switch command and changes the frequency of the clock signal 108 at a last falling edge of a frame boundary (block 506). The master device 102 then starts a new frame with a new frequency and sample interval (block 508).

While switching frequencies in such a manner as to prevent phase shifts has value in reducing audio artifacts presented to a listener, there are many instances where frequency changes may occur. In particular, when multiple audio sources are independently activated, the addition of an extra active audio source may increase the bandwidth requirement. As the frequency of the audio bus may change, the location in a frame into which audio sources place their respective audio data may shift.

Figure 6:
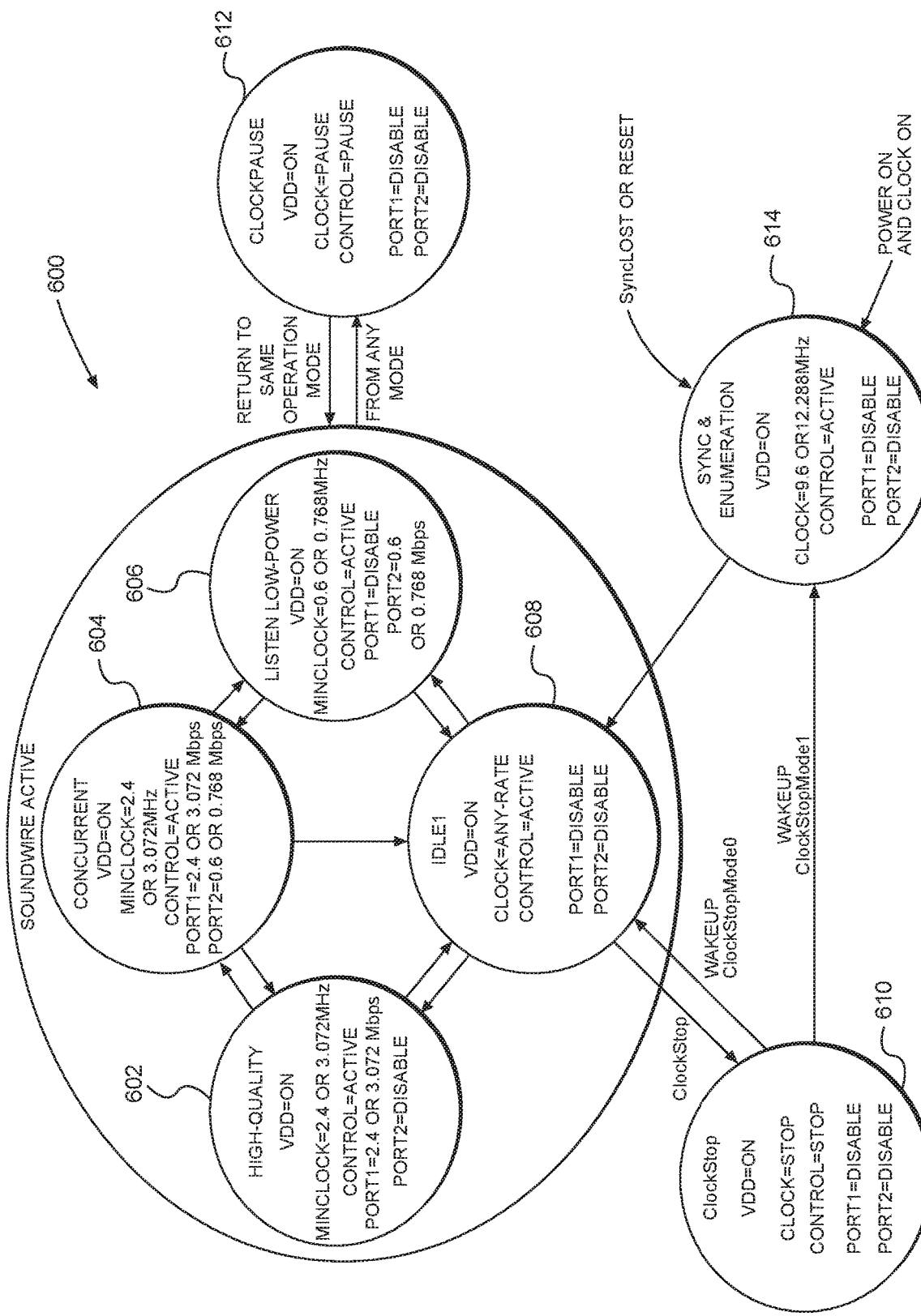
FIG. 6 is a state diagram of various states the computing device of FIG. 1 may enter.

For example, FIG. 6 illustrates a state diagram 600 of various states the computing device of FIG. 1 may enter as microphones (or different ports within a single microphone) are turned on and off and the frequency of the bus may change. Of particular interest is high quality state 602, where at least one port is using a relatively high clock frequency and another port is disabled. Contrast high quality state 602 with concurrent state 604 where multiple ports are in use, requiring a relatively high clock frequency. Contrast concurrent state 604 with a listen low-power state 606 where one port is disabled and a relatively low-frequency clock is used. Finally, contrast the low-power state 606 with an idle state 608 where both ports are disabled. Note that in each of the states 602, 604, 606, and 608, the primary power VDD remains on and a control channel remains active.

The active states 602, 604, 606, and 608 are contrasted with a clock stop state 610, which disables or stops the clock, stops the control channel, and disables both ports. Similarly, clock pause state 612 disables the two ports, but merely pauses the clock and control channels. Clock pause state 612 can be entered from or exit to any of the states 602, 604, 606, or 608 (although typically clock pause state 612 will exit to the same state from which it was entered). In contrast, the clock stop state 610 can only be entered from and exit to the idle state 608.

One other state is defined herein, namely the enumeration state 614 which is used at power on or synchronization reset times. In enumeration state 614, the clock and control channels are active but the ports are disabled and the control channel is being used to enumerate the slaves on the communication bus 106.

As noted, while making sure that the communication bus 106 and frequency changes thereon do not create phase shifts which would degrade the user experience, there are other potential phase differences in a multi-microphone environment which may be reduced to help improve the user experience. Specifically, the user experience may be improved by making sure that the audio streams from multiple inputs are aligned prior to placing the plural streams on the communication bus 106. Such multiple inputs may be, for example, different ports on a single audio source or multiple microphones.

Figure 7:
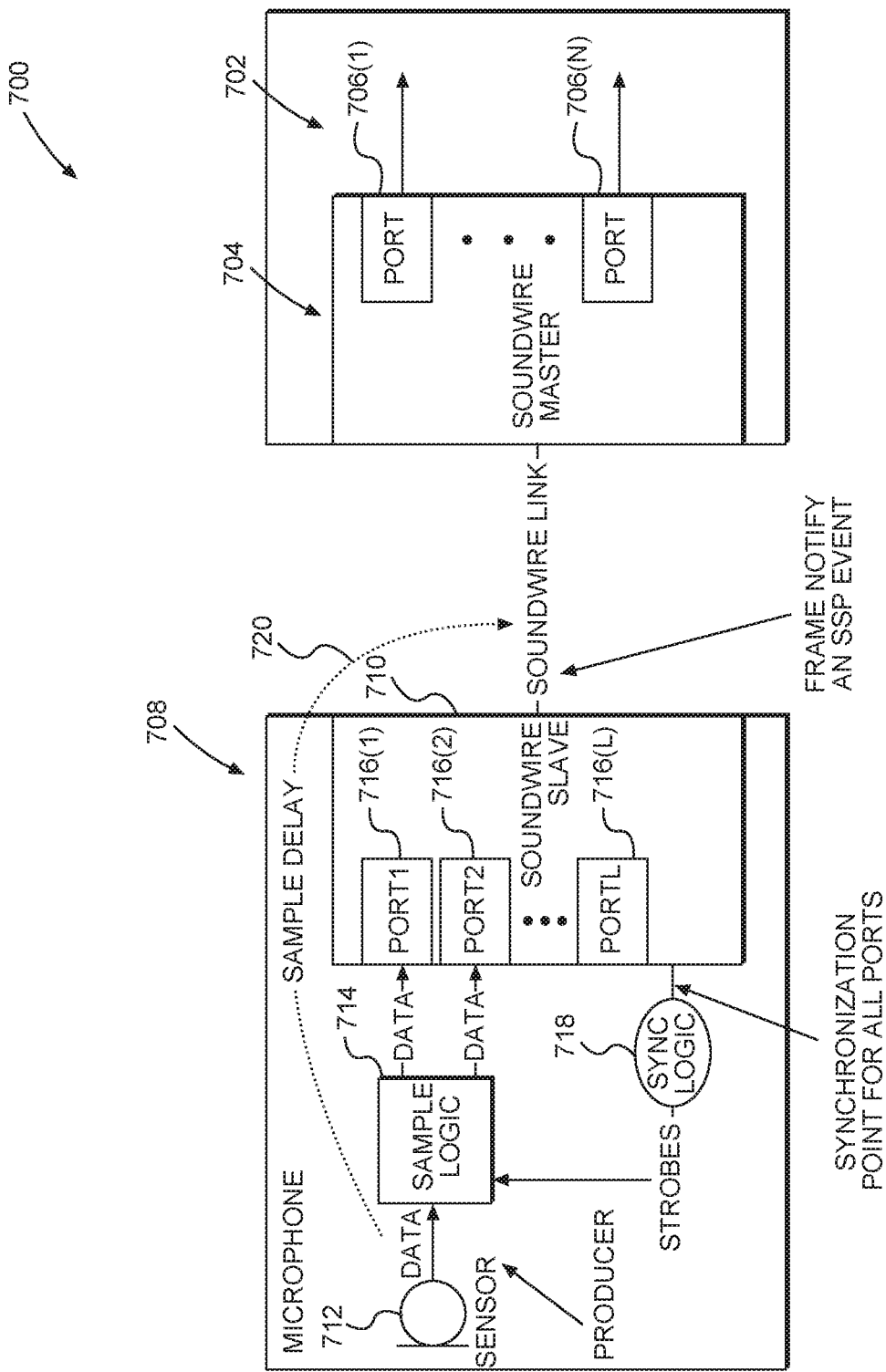
FIG. 7 is a block diagram of an exemplary aspect of an audio system that aligns plural audio sources before placing them in a SOUNDWIRE frame.
Figure 8:
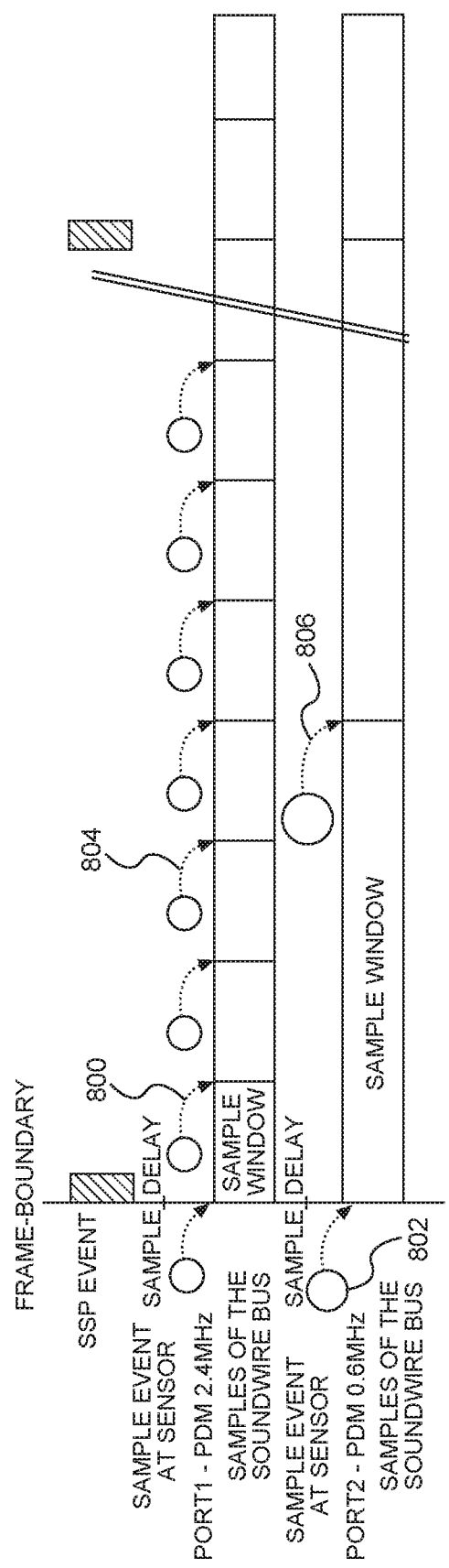
FIG. 8 is a timing diagram showing audio samples being aligned for placement in a SOUNDWIRE frame.

In this regard, FIGS. 7 and 8 illustrate one technique through which the multiple samples may be phase aligned. In this regard, FIG. 7 illustrates a computing device 700 having a first integrated circuit (IC) 702 with a SOUND-WIRE master component 704. The SOUNDWIRE master component 704 includes a plurality of output ports 706(1)-706(M). Audio data from the output ports 706(1)-706(M) may be provided to a digital signal processor (DSP) or the like for further processing. The computing device 700 further has microphone system 708 that includes a SOUND-WIRE slave component 710. The microphone system 708 may include a plurality of analog to digital converters (ADCs) 712 (i.e., the actual sensor that detects sound) (only one shown). Likewise, it is possible that a single ADC may provide output to multiple ports. For example, a listen only channel may operate at a relatively low frequency such as 0.6 MHz while a more active channel may operate at 2.4 MHz. In any event, data from the ADC 712 is passed to a sample logic 714 and from the sample logic 714 to ports 716(1)-716(L) in the SOUNDWIRE slave component 710. A synchronization logic circuit 718 is coupled to the SOUNDWIRE slave component 710 and provides synchronization strobes to the sample logic 714. The synchronization strobes assure that the samples are taken at the same time from the ADC 712.

With continued reference to FIG. 7 a sample delay 720 is measured from when the sample is actually taken at the ADC 712 to a time when the sample is placed on the SOUND-WIRE bus in a corresponding sample window time. The sample window time starts with the frame boundary following a stream synchronization point (SSP) event. SSP events such as the bank switch command are defined in the SOUNDWIRE specification and are well understood.

Where multiple ports are active, phase alignment for all active channels between different microphone components (both plural ports in a single microphone and ports across multiple microphones) improves the user experience. The SOUNDWIRE master component 704 provides a SSP indication (e.g., a bank switch command), which takes place at the end of the frame boundary, indicating that all samples from all active channels are aligned at that point of time. The sample delay 720 from the sample event at the microphone analog section to the sample window time on the communication bus 106 should be constant for all data ports and operating conditions. While individual ports may have different sample delays (see, for example, sample delay 800 for port 1 in FIG. 8 versus sample delay 802 for port 2 in FIG. 8), the sample delay should be identical every time the microphone port is enabled. Thus sample delay 804 should be the same as sample delay 800 and sample delay 806 should be identical to sample delay 802. All samples of all ports shall be aligned to the SSP at the frame boundary, and shall be transported on the communication bus 106 at the sample window starting at that frame boundary. Note that, as illustrated, the samples 800 and 804 are in a relatively high-frequency signal (e.g., 2.4 MHz) relative to the low frequency of the other samples 802, 806 (e.g., 0.6 MHz), There may be other situations where aligning audio samples is appropriate. That is, even though the clock frequency changes are orchestrated such that there is not a phase shift, there may be other locations in an audio system where audio samples can be misaligned or phase shifted relative to one another, for example, when doing beam forming using a microphone array or playing audio while changing the amplifier gain synchronously. In such instances, the audio sample event may be synchronized at components by an audio producer circuit (e.g., a microphone and ADC). In such instances, it is appropriate to achieve a deterministic and fixed delay from an SSP end producer circuit for all channels on all components. Exemplary aspects of the present disclosure address such situations in FIGS. 9-13.

In a first exemplary aspect, the different microphones are enabled at different times. Software cannot align these differing enable events with the SSP because of the internal high-speed clocks in the IC relative to the software latency. To achieve the desired alignment, the present disclosure provides an internal enable to the producers (e.g., microphones) that combines a software enable signal with the SSP event.

Figure 9:
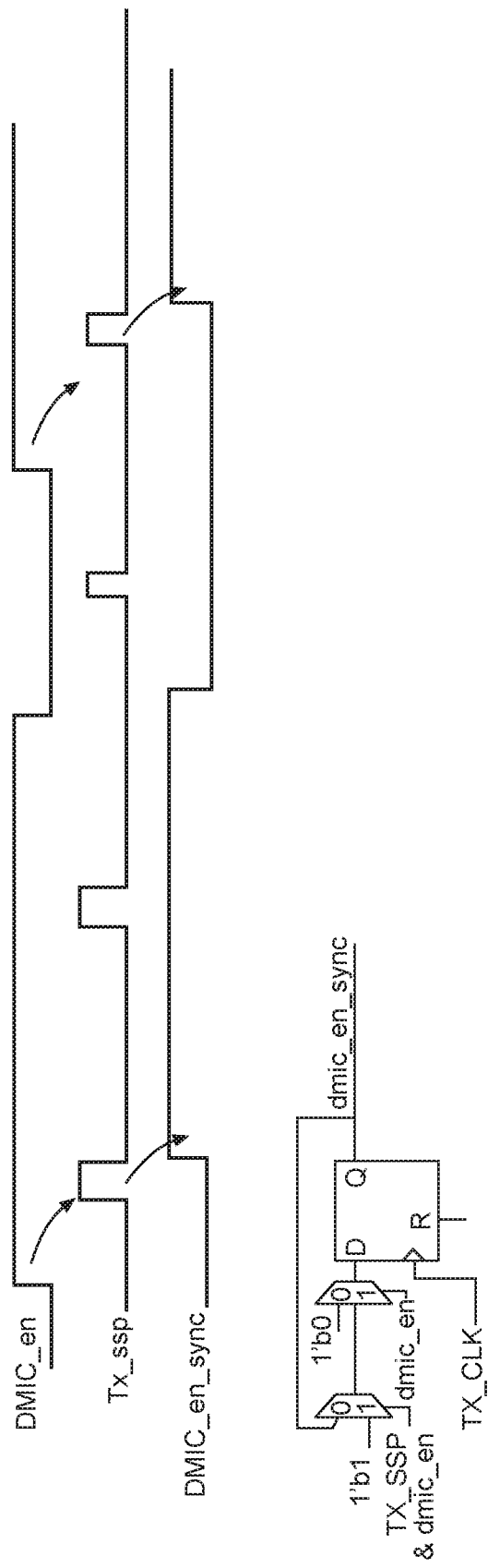
FIG. 9 is a signal versus time timing diagram showing software and event latches before enabling synchronization.

FIG. 9 illustrates this hybrid approach, where the DMIC_en is the signal from the software, Tx_ssp is the SSP event, and the DMIC_en_sync signal is the internally generated control of the microphone. As is readily apparent, the DMIC_en_sync signal is only enabled after both the DMIC_en signal and the SSP event. An exemplary circuit is also provided for how the DMIC_en_sync signal is created.

Figure 10:
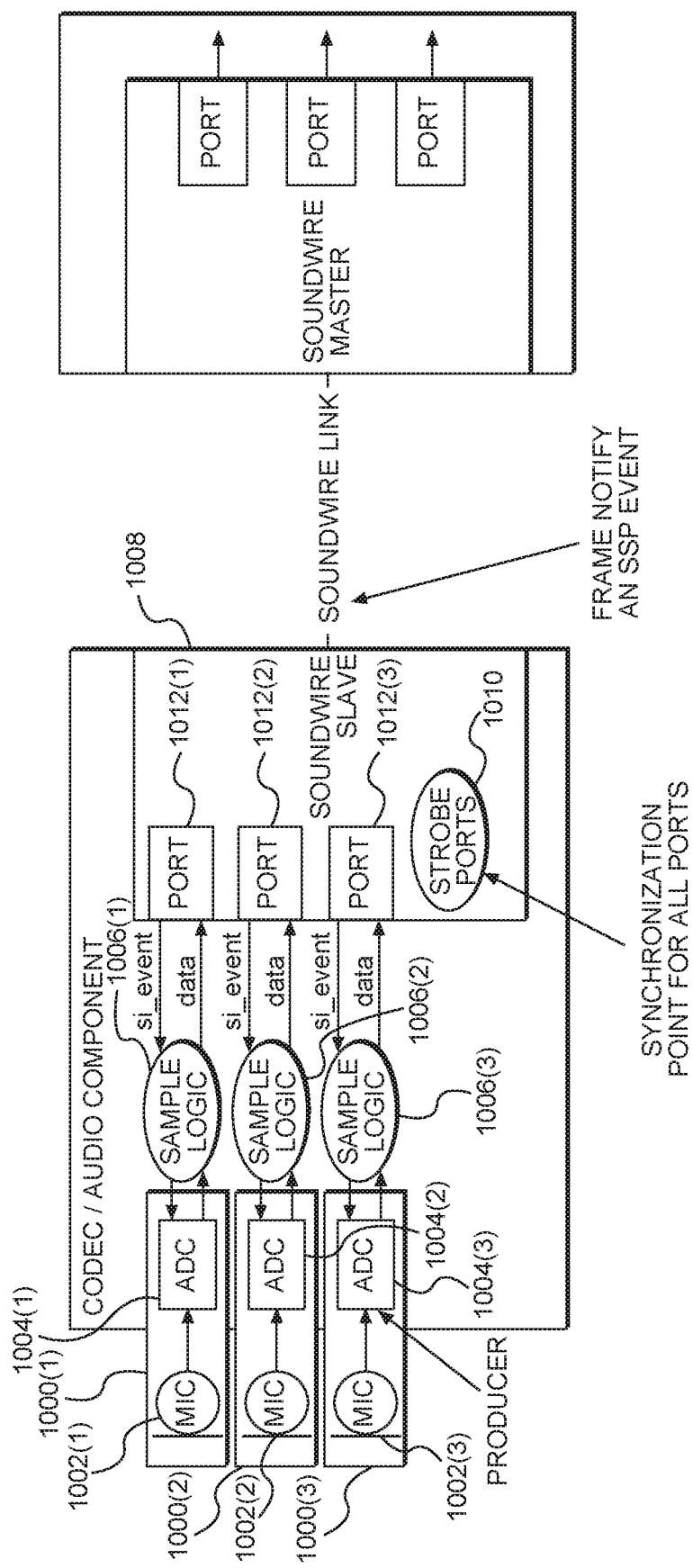
FIG. 10 illustrates an alternate exemplary aspect for aligning signals from multiple microphones where a strobe signal is generated in a SOUNDWIRE element of an integrated circuit (IC)

FIG. 10 illustrates a situation where producer circuits 1000(1)-1000(3) include microphones 1002(1)-1002(3) and corresponding ADC circuits 1004(1)-1004(3), each with a corresponding sample logic circuit 1006(1)-1006(3). A SOUNDWIRE circuit 1008 includes a strobe circuit 1010 which strobes ports 1012(1)-1012(3) causing an SI_EVENT to be passed to the sample logic circuits 1006(1)-1006(3).

Responsive to the SI_EVENT, the sample logic circuits 1006(1)-1006(3) pass the data to the ports 1012(1)-1012(3) in the SOUNDWIRE circuit 1008.

Figure 11:
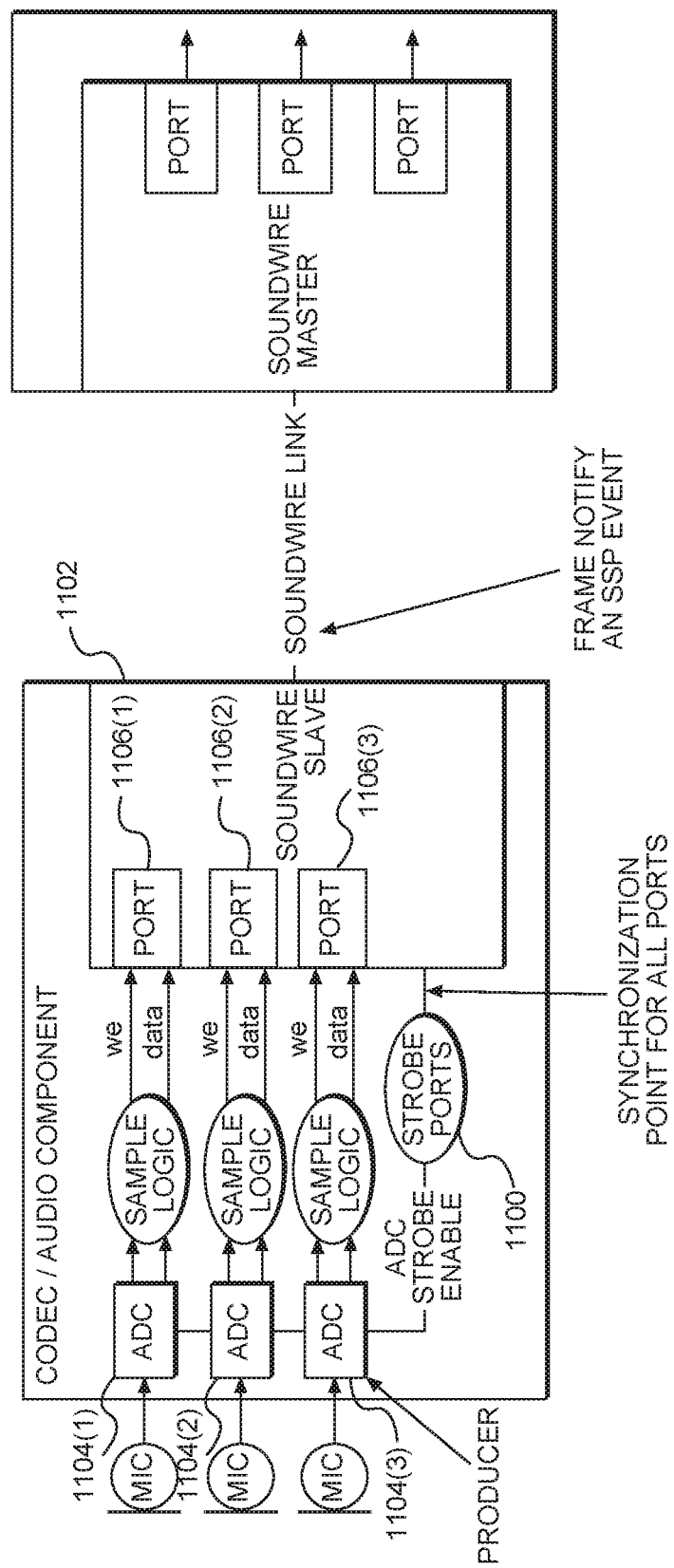
FIG. 11 illustrates another alternate exemplary aspect for aligning signals from multiple microphones where a strobe signal is generated outside a SOUNDWIRE element of an IC and provided to provider circuits.

FIG. 11 is similar, but a strobe circuit 1100 is outside a SOUNDWIRE circuit 1102, and strobes ADC circuits 1104 (1)-1104(3) directly, which causes the data and the write enable (we) signal to pass to ports 1106(1)-1106(3).

Figure 12:
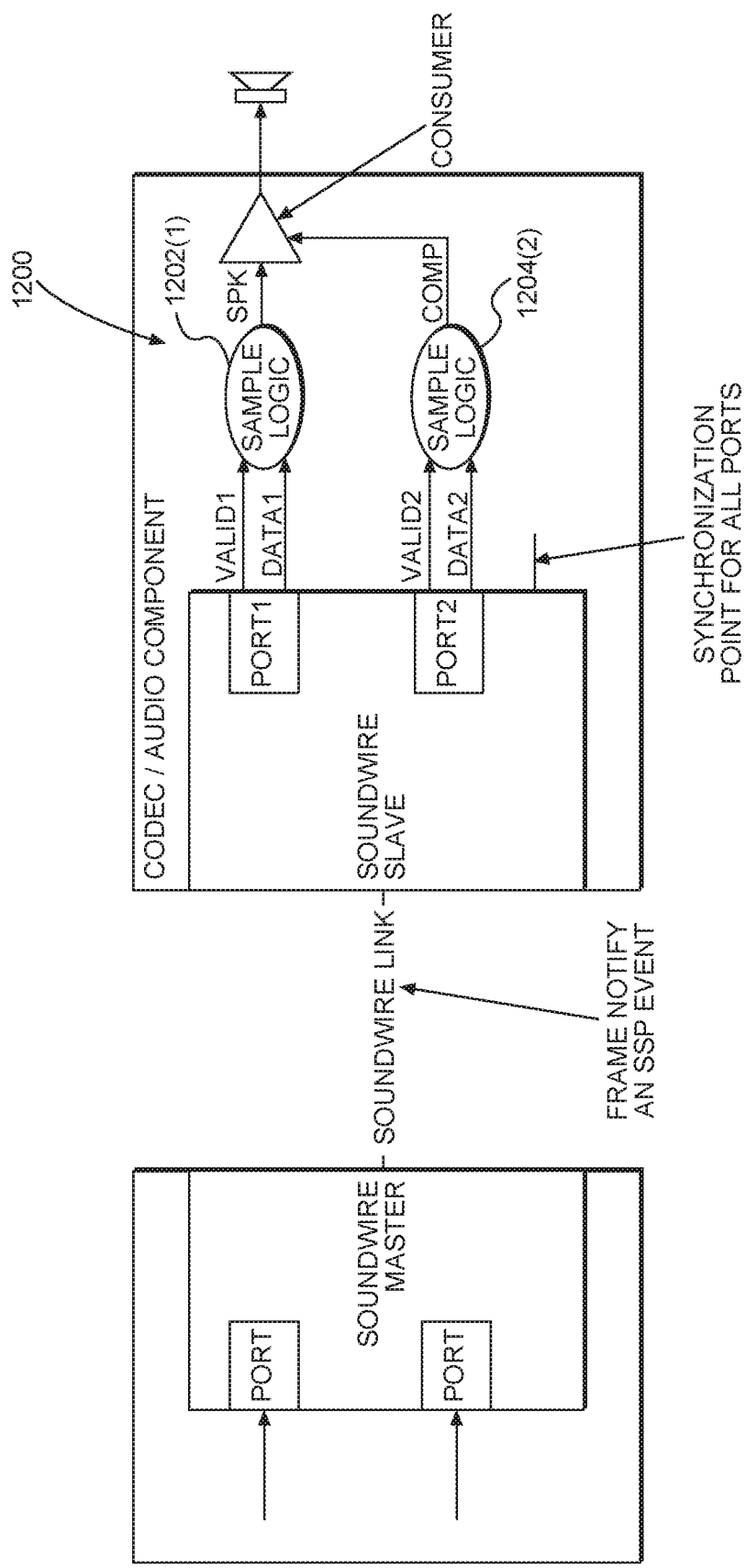
FIG. 12 illustrates an alternate exemplary aspect where two SOUNDWIRE ports are running at different rates, but synchronized at a slave before playback.

FIG. 12 is a situation where the alignment is done at a speaker 1200 before playback when the speaker 1200 has two (or more) ports running at different rates. The data comes from the ports and is released to sample logic circuits 1202(1)-1202(2) by an SSP event sent from the master.

Figure 13:
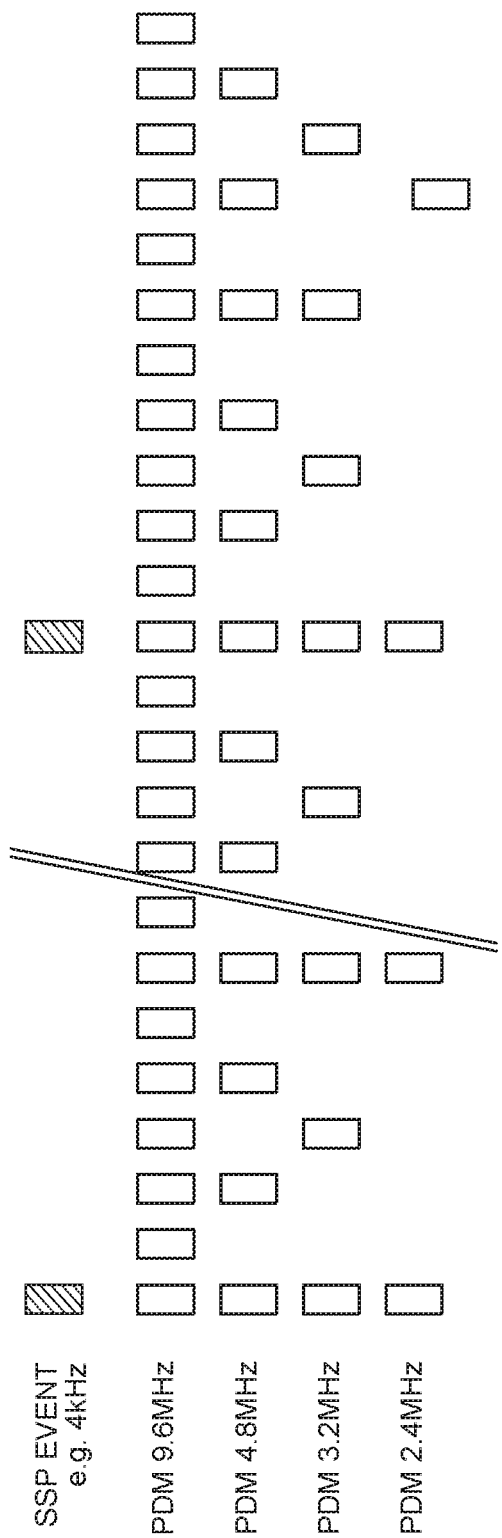
FIG. 13 illustrates different rates being synchronized.

FIG. 13 shows the aligned signals.

The systems and methods for phase alignment in an audio bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 14:
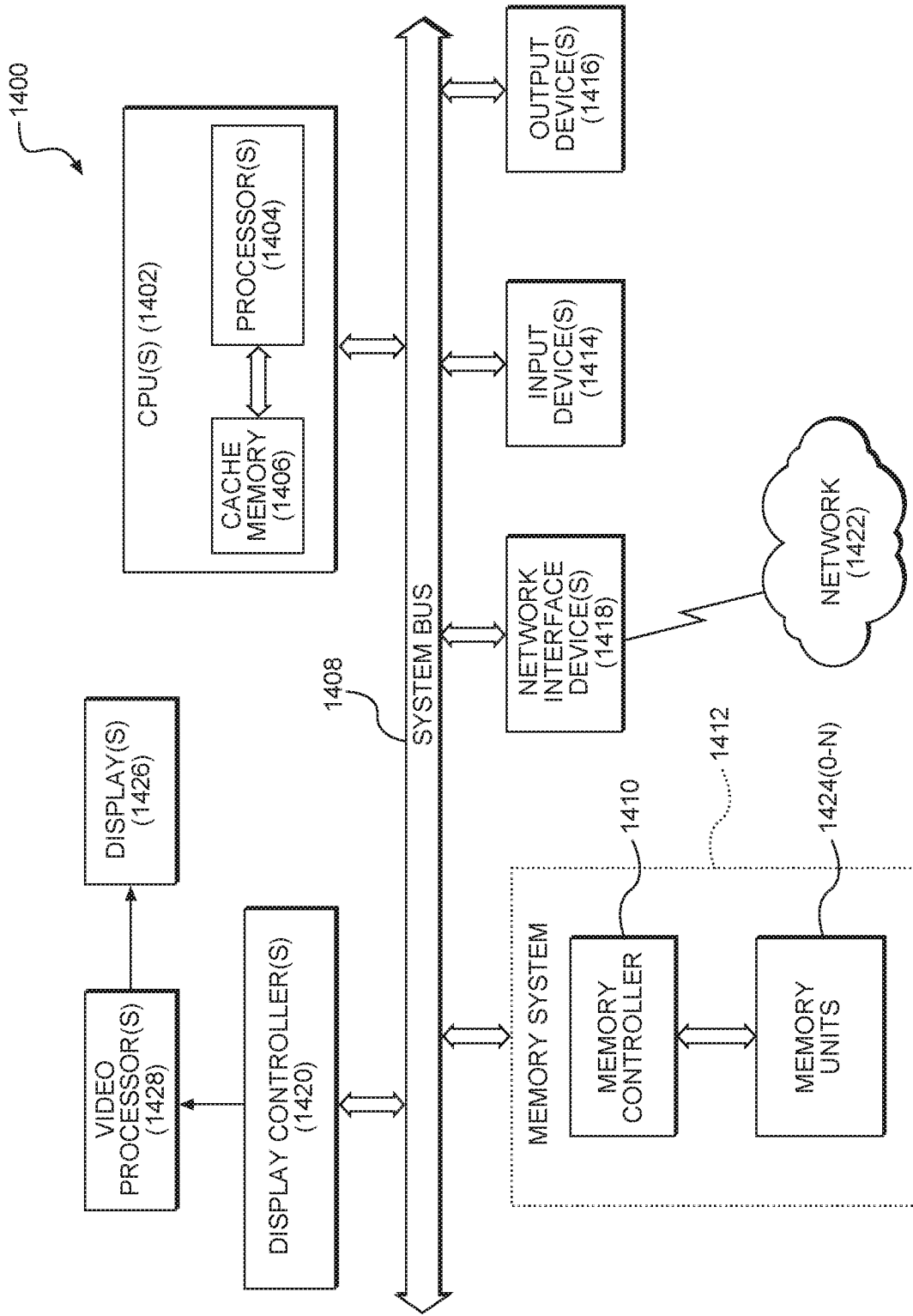
FIG. 14 is a block diagram of an exemplary processor-based system that can include the audio system of FIG. 1.

In this regard, FIG. 14 illustrates an example of a processor-based system 1400 that can employ the audio system 100 illustrated in FIG. 1. In this example, the processor-based system 1400 includes one or more central processing units (CPUs) 1402, each including one or more processors 1404. The CPU(s) 1402 may have cache memory 1406 coupled to the processor(s) 1404 for rapid access to temporarily stored data. The CPU(s) 1402 is coupled to a system bus 1408 and can intercouple master and slave devices included in the processor-based system 1400. As is well known, the CPU(s) 1402 communicates with these other devices by exchanging address, control, and data information over the system bus 1408. For example, the CPU(s) 1402 can communicate bus transaction requests to a memory controller 1410 as an example of a slave device. Although not illustrated in FIG. 14, multiple system buses 1408 could be provided, wherein each system bus 1408 constitutes a different fabric.

Other master and slave devices can be connected to the system bus 1408. As illustrated in FIG. 14, these devices can include a memory system 1412, one or more input devices 1414, one or more output devices 1416, one or more network interface devices 1418, and one or more display controllers 1420, as examples. The input device(s) 1414 can include any type of input device, including, but not limited to, input keys, switches, voice processors, etc. The output device(s) 1416 can include any type of output device, including, but not limited to, audio, video, other visual indicators, etc. The network interface device(s) 1418 can be any devices configured to allow exchange of data to and from a network 1422. The network 1422 can be any type of network, including networks such as the phone network and the Internet. The network interface device(s) 1418 can be configured to support any type of communications protocol desired. The memory system 1412 can include one or more memory units 1424(0-N).

The CPU(s) 1402 may also be configured to access the display controller(s) 1420 over the system bus 1408 to control information sent to one or more displays 1426. The display controller(s) 1420 sends information to the display(s) 1426 to be displayed via one or more video processors 1428, which process the information to be displayed into a format suitable for the display(s) 1426. The display(s) 1426 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method of aligning plural audio signals from plural audio sources, the method comprising:
    for each audio source of the plural audio sources:
        collecting audio data at a sample logic circuit from a respective audio source;
        strobing the sample logic circuit to release the audio data to an audio port in a SOUNDWIRE circuit; and
        synchronizing strobes with a synchronization logic circuit.

2. The method of claim 1, wherein strobing the sample logic circuit comprises using a strobe circuit in the SOUNDWIRE circuit.

3. The method of claim 1, wherein strobing the sample logic circuit comprises using a strobe circuit external to the SOUNDWIRE circuit.

4. The method of claim 1, further comprising generating the audio data at different rates amongst the plural audio sources.

5. The method of claim 1, wherein the plural audio sources comprise plural microphones.

6. The method of claim 1, wherein the plural audio sources comprise different ports on a single microphone.

7. The method of claim 1, further comprising turning off an audio source and changing a bus frequency concurrently.

8. The method of claim 1, further comprising maintaining a sample delay constant for a given audio source.

9. An apparatus comprising a SOUNDWIRE slave device, the SOUNDWIRE slave device comprising:
    a plurality of audio sources;
    a sample logic circuit coupled to the plurality of audio sources and configured to collect audio data therefrom responsive to a strobe from the sample logic circuit; and
    a synchronization logic circuit to synchronize strobes.

10. The apparatus of claim 9, wherein the synchronization logic circuit is positioned within a SOUNDWIRE slave circuit.

11. The apparatus of claim 9, wherein the synchronization logic circuit is external to a SOUNDWIRE slave circuit.

12. The apparatus of claim 9, further comprising a SOUNDWIRE slave circuit comprising a bus interface.

13. The apparatus of claim 12, wherein a sample delay between acquisition of an audio sample and placement on an audio bus through the bus interface is a constant value for a plurality of audio samples.

14. The apparatus of claim 9, wherein the plurality of audio sources comprises a plurality of microphones.

15. The apparatus of claim 9, wherein the plurality of audio sources comprises a plurality of ports on a single microphone.

16. The apparatus of claim 9, wherein the plurality of audio sources operate at different data rates.

17. An apparatus comprising:
    a speaker;
    a plurality of sample logic circuits coupled to the speaker;
    a SOUNDWIRE slave circuit comprising a plurality of data ports, each of the plurality of data ports coupled to respective ones of the plurality of sample logic circuits; and
    a synchronization logic circuit coupled to the SOUNDWIRE slave circuit and configured to cause each of the plurality of data ports to release audio data to the respective ones of the plurality of sample logic circuits concurrently.

* * * * *